(12) United States Patent
Herman et al.

(10) Patent No.: US 12,449,541 B2
(45) Date of Patent: Oct. 21, 2025

(54) ANONYMIZING PERSONALLY IDENTIFIABLE INFORMATION IN SENSOR DATA

(71) Applicant: Ford Global Technologies, LLC, Dearborn, MI (US)

(72) Inventors: David Michael Herman, West Bloomfield, MI (US); Alexander George Shanku, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 828 days.

(21) Appl. No.: 17/746,015

(22) Filed: May 17, 2022

(65) Prior Publication Data

US 2023/0375707 A1 Nov. 23, 2023

(51) Int. Cl.
*G01S 17/89* (2020.01)
*G01S 7/48* (2006.01)
*G06F 21/62* (2013.01)

(52) U.S. Cl.
CPC ............ *G01S 17/89* (2013.01); *G01S 7/4802* (2013.01); *G06F 21/6254* (2013.01)

(58) Field of Classification Search
CPC ...... G01S 17/89; G01S 7/4802; G01S 17/931; G01S 17/88; G06F 21/6254
See application file for complete search history.

(56) References Cited

U.S. PATENT DOCUMENTS

| 8,489,181 | B1 | 7/2013 | Schipper et al. |
| 9,905,032 | B2 | 2/2018 | Rogan et al. |
| 9,940,525 | B2 | 4/2018 | Wolf |
| 2018/0365888 | A1* | 12/2018 | Satzoda ............... G05D 1/0251 |
| 2020/0126208 | A1 | 4/2020 | Ponto et al. |
| 2021/0004486 | A1 | 1/2021 | Adams et al. |
| 2022/0126864 | A1* | 4/2022 | Moustafa .............. B60W 50/14 |

FOREIGN PATENT DOCUMENTS

KR 102343061 B1 12/2021

OTHER PUBLICATIONS

Antognoli et al., "Heartbeat Detection by Laser Doppler Vibrometry and Machine Learning", Sensors 2020, 20, 5362.
Hanisch et al., "Privacy-Protecting Techniques for Behavioral Data: A Survey", arXiv:2109.04120v1 [cs.CR] Sep. 9, 2021.
Royo et al., "An Overview of Lidar Imaging Systems for Autonomous Vehicles", Appl. Sci. 2019, 9, 4093; doi:10.3390/app9194093.

* cited by examiner

*Primary Examiner* — Seung C Sohn
(74) *Attorney, Agent, or Firm* — Frank A. MacKenzie; Brooks Kushman P.C.

(57) ABSTRACT

A computer includes a processor and a memory, and the memory stores instructions executable by the processor to receive lidar data from a lidar device, generate a point cloud from the lidar data, identify an object in the point cloud, and, upon identifying the object, delete a portion of the lidar data that is from a region encompassing the object. The object includes personally identifiable information.

20 Claims, 3 Drawing Sheets

ANONYMIZING PERSONALLY IDENTIFIABLE INFORMATION IN SENSOR DATA

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

DETAILED DESCRIPTION

Figure 1:
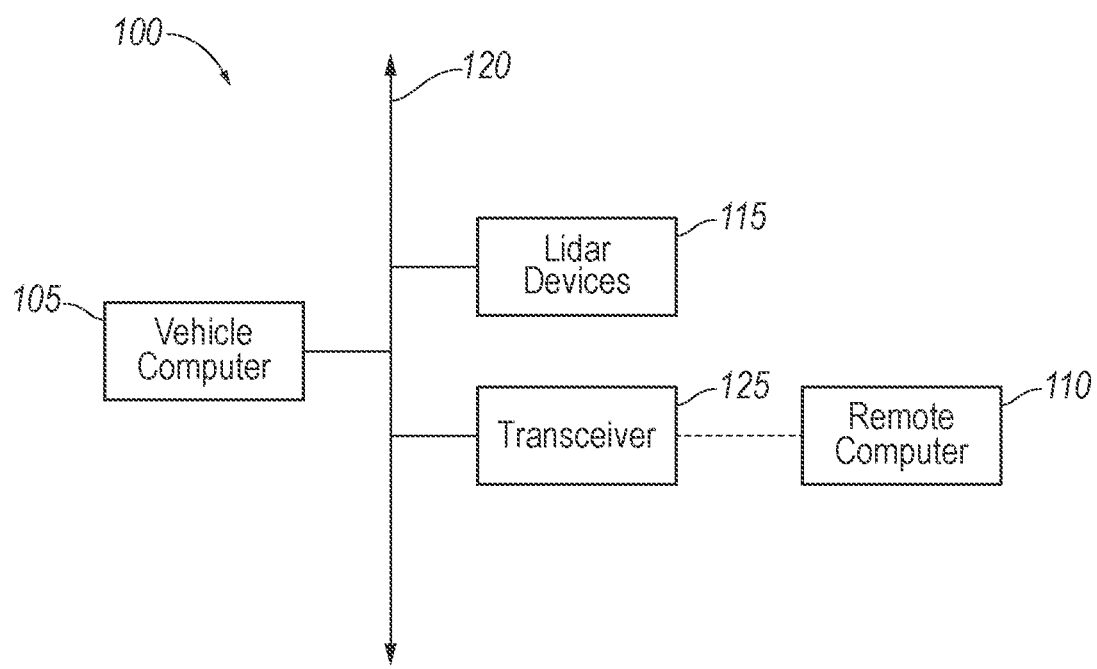
FIG. 1 is a block diagram of an example vehicle in communication with a remote computer.

This disclosure provides techniques for anonymizing objects in data generated by a lidar device. Examples of personally identifiable information (PII) in lidar data include faces, images of signs or text (e.g., license plates), gait, heartbeat, voice, etc. Lidar data may allow identification of a person from such PII if the lidar data is sufficiently dense and/or if the lidar data is collected over time. Lidar data may also allow identification of a person from additional sensing characteristics besides locations of points in a point cloud, e.g., ambient illumination, active illumination reflectance, relative radial velocity, polarization, etc. To prevent identification of a person from PII in lidar data, a computer can be programmed to receive the lidar data, generate a point cloud from the lidar data, identify a PII object in the point cloud, and, upon identifying the PII object, delete a portion of the lidar data that is from a region encompassing the object. Deleting the portion of the lidar data can include reducing a density of the point cloud in the region and/or removing or blurring the additional sensing characteristics. The density can be measured as a number of points per unit volume. The resulting lidar data can thereby prevent identification of a person from the PII object while retaining a high density and the additional sensing characteristics elsewhere in the point cloud. Retaining that lidar data can mean that the lidar data may still be suitable for various types of analysis post-anonymization, e.g., to assess performance of a vehicle and/or subsystems thereof, e.g., advanced driver assistance systems (ADAS) of a vehicle.

A computer includes a processor and a memory, and the memory stores instructions executable by the processor to receive lidar data from a lidar device; generate a point cloud from the lidar data; identify an object in the point cloud, the object including personally identifiable information; and upon identifying the object, delete a portion of the lidar data that is from a region encompassing the object.

Deleting the portion of the lidar data that is from the region may include reducing a density of the point cloud in the region. Reducing the density of the point cloud in the region may be conditional on the density in the region before reduction exceeding a threshold.

The lidar data may include locations of points and additional sensing characteristics, and deleting the portion of the lidar data that is from the region may include removing or blurring the additional sensing characteristics in the region. The additional sensing characteristics may include active illumination reflectance.

The additional sensing characteristics may include polarization data.

The additional sensing characteristics include relative radial velocity.

The additional sensing characteristics may include ambient illumination.

The object may include text.

The object may include a face of a person.

The object may include a person that is walking.

The instructions may further include instructions to detect a vibration in locations of points of the point cloud over time, the vibration including personally identifiable information; and upon detecting the vibration, obscure the vibration. Obscuring the vibration may include removing doppler shift of the points.

Obscuring the vibration may include adding noise to the vibration.

The instructions may further include instructions to receive motion data of a vehicle including the lidar device; and before detecting the vibration, adjust the point cloud based on the motion data.

Identifying the object in the point cloud and deleting the portion of the lidar data from the region may be conditional on receiving a determination to save the lidar data.

The point cloud may be a combined point cloud, the lidar data may include a plurality of individual point clouds from respective sweeps by the lidar device, and the combined point cloud may be generated by combining the plurality of individual point clouds.

The lidar data may be collected over a time range.

The instructions may further include instructions to transmit the lidar data from a vehicle including the lidar device to a remote computer that is remote from the vehicle.

A method includes receiving lidar data from a lidar device; generating a point cloud from the lidar data; identifying an object in the point cloud, the object including personally identifiable information; and upon identifying the object, deleting a portion of the lidar data that is from a region encompassing the object.

With reference to the Figures, wherein like numerals indicate like parts throughout the several views, a computer 105, 110 includes a processor and a memory, and the memory stores instructions executable by the processor to receive lidar data from at least one lidar device 115, generate a point cloud 200 from the lidar data, identify an object 205 in the point cloud 200, and, upon identifying the object 205, delete a portion of the lidar data that is from a region 210 encompassing the object 205. The object 205 includes personally identifiable information. The computer 105, 110 can be a vehicle computer 105 on board a vehicle 100 to which the lidar device 115 is mounted, or the computer 105, 110 can be a remote computer 110 that is spaced from the vehicle 100.

With reference to FIG. 1, the vehicle 100 may be any passenger or commercial automobile such as a car, a truck, a sport utility vehicle, a crossover, a van, a minivan, a taxi, a bus, a jeepney, etc.

The vehicle computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 105 can thus include a processor, a memory, etc. The memory of the vehicle computer 105 can include media for storing instructions executable by the processor as well as for electronically storing data and/or databases, and/or the vehicle computer 105 can include structures such as the foregoing by which programming is provided. The vehicle computer 105 can be multiple computers coupled together.

The vehicle computer 105 may transmit and receive data through a communications network 120 such as a controller area network (CAN) bus, Ethernet, WiFi, Local Interconnect Network (LIN), onboard diagnostics connector (OBD-II), and/or by any other wired or wireless communications network. The vehicle computer 105 may be communicatively coupled to the lidar devices 115, a transceiver 125, and other components via the communications network 120.

The lidar device 115 is a "light detection and ranging" device. The lidar device 115 can detect distances to objects 205 by emitting laser pulses at a particular wavelength and measuring the time of flight for the pulse to travel to the object 205 and back. The lidar device 115 can be any suitable type for providing the lidar data on which the vehicle computer 105 can act, e.g., spindle-type lidar, solid-state lidar, flash lidar, etc. The lidar device 115 can be fixedly mounted to an exterior of the vehicle 100 so that the lidar device 115 has a field of view encompassing an environment surrounding the vehicle 100.

The transceiver 125 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 125 may be adapted to communicate with the remote computer 110, that is, a computer distinct and spaced from the vehicle 100. The remote computer 110 may be located outside the vehicle 100. For example, the remote computer 110 may be associated with another vehicle (e.g., V2V communications), an infrastructure component (e.g., V2I communications), an emergency responder, a mobile device associated with the owner of the vehicle 100, a manufacturer or fleet owner of the vehicle 100, etc. The transceiver 125 may be one device or may include a separate transmitter and receiver.

The remote computer 110 is a microprocessor-based computing device, e.g., a generic computing device including a processor and a memory. The memory of the remote computer 110 can include media for storing instructions executable by the processor as well as for electronically storing data and/or databases. The remote computer 110 can be multiple computers coupled together.

Figure 2:
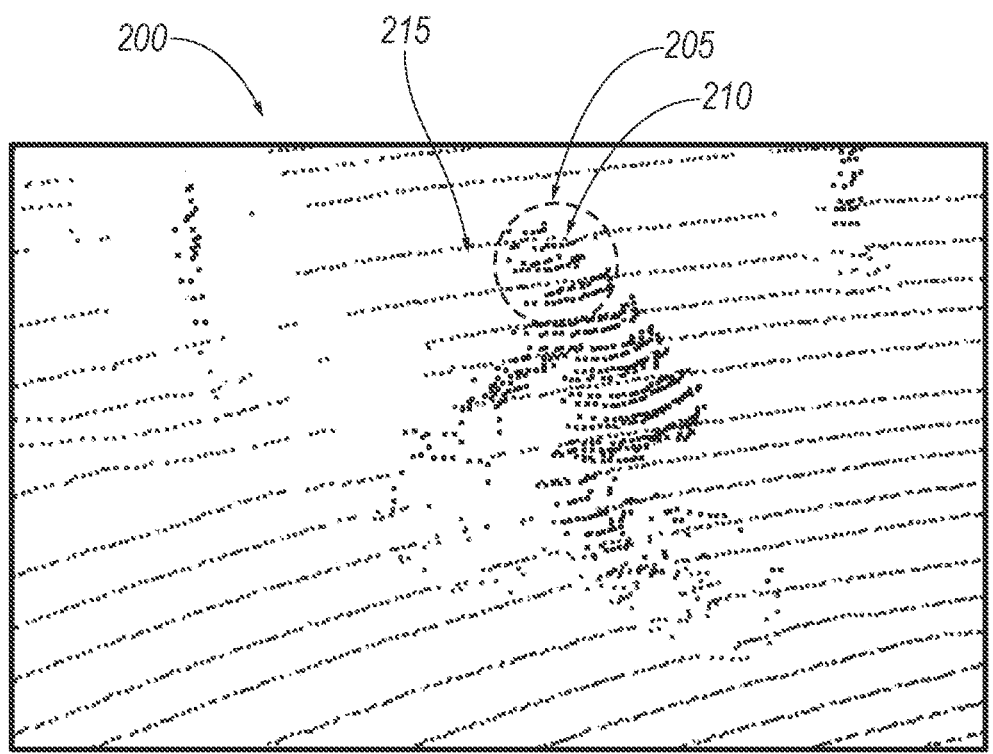
FIG. 2 a diagram of an example point cloud from a lidar device of the vehicle.

With reference to FIG. 2, the lidar device 115 can generate lidar data. The lidar data can include a plurality of individual point clouds 200 from respective sweeps by the lidar device 115, e.g., for a spindle-type device. A point cloud 200 includes a plurality of points, which are three-dimensional locations in space, e.g., relative to the lidar device 115. Each point can be generated by the lidar device 115 emitting and receiving a pulse defining a direction and distance to the point. The plurality of point clouds 200 can be generated by collecting lidar data over a time range and/or by multiple lidar devices 115 on the vehicle 100.

The lidar data can include additional sensing characteristics besides the locations of the points of the point cloud 200. The additional sensing characteristics are data generated by the lidar device 115 other than the locations of the points of the point cloud 200. For example, the additional sensing characteristics can include ambient illumination. Ambient illumination is light detected by the lidar device 115 from a source other than the lidar device 115, i.e., not a reflected pulse, e.g., from direct or reflected sunlight. The lidar device 115 can be configured to receive a range of light wavelengths, e.g., a portion of the infrared spectrum, that encompasses the wavelength of the pulses emitted by the lidar device 115. The ambient illumination can be light that happens to fall within the same range of light wavelengths.

For another example, the additional sensing characteristics can include active illumination reflectance. The active illumination reflectance is a measure of the reflection by a feature of the environment of the light generated by the lidar device 115, e.g., the pulse. The reflectance of a surface is the surface's effectiveness in reflecting radiant energy, which can be measured as a fraction of incident electromagnetic power that is reflected. The active illumination reflectance can be defined by, e.g., the intensity of a returning pulse. This measured active illumination magnitude when accounting for dispersion of the pulse over distance can be used to estimate the surface's reflectivity at the pulse's wavelength.

For another example, the additional sensing characteristics can include relative radial velocity. A radial velocity of a point, in the context of lidar data, is the component of a total velocity along a line from the point to the lidar device 115. The lidar device 115 can detect radial velocities of the points of the point cloud 200 by taking advantage of the Doppler effect, i.e., the way that the wavelength of the returning pulse changes according to how quickly the feature reflecting the pulse is moving toward or away from the lidar device 115. The radial velocities can be relative in that the radial velocities are measured relative to the lidar device 115 rather than relative to the environment.

For another example, the additional sensing characteristics can include polarization data. In this context, polarization refers to the orientation of the waves forming the light received by the lidar device 115. The light received by the lidar device 115 is generally unpolarized, i.e., the light waves are oriented in all directions around the direction that the light is traveling. Light can become polarized by being reflected by or passing through materials with certain optical properties, e.g., birefringence, dichroism, optical activity, etc. The angle of polarization (AOP) and degree of polarization (DOP) depends on the material, atmospheric conditions, and surface orientation from which the pulse reflects. Even weakly polarized materials can provide information on surface orientation where the DOP is low but AOP can be measured with sufficiently high confidence.

The vehicle computer 105 and/or remote computer 110 can be programmed to receive the lidar data from the lidar device 115. For example, the vehicle computer 105 can receive the lidar data from the lidar device 115 via the communications network 120. For another example, the remote computer 110 can receive the lidar data via the vehicle computer 105 instructing the transceiver 125 to transmit the lidar data to the remote computer 110.

The vehicle computer 105 and/or remote computer 110 can be programmed to generate the point cloud 200 from the lidar data. The point cloud 200 can be a combined point cloud 200 generated by combining the plurality of the individual point clouds 200. For example, the vehicle computer 105 and/or remote computer 110 can superimpose the individual point clouds 200. The individual point clouds 200 can be superimposed in a reference frame fixed to the environment, i.e., as measured relative to the environment and not relative to the vehicle 100 or the lidar device 115. For example, the vehicle computer 105 and/or remote computer 110 can receive motion data of the vehicle 100 and adjust the point cloud 200 based on the motion data. The motion data can be a series of positions of the vehicle 100 relative to the environment at different times, e.g., from a GPS sensor and/or from dead reckoning. The positions of the vehicle 100 can be used to transform the individual point clouds 200 from a reference frame fixed to the lidar device 115 to the reference frame fixed to the environment. As the vehicle 100 moves through space, the transformations will be different. The combined point cloud 200 can have a varying density of points, resulting from the varying density within the individual point clouds 200 and/or from the number of individual point clouds 200 covering features of the environment being different. As a further example, objects 205 such as a pedestrians and vehicles containing PII data may be mobile in the environment. By using simultaneous localization and mapping (SLAM) with moving object detection and tracking in three-dimensional range data, multiple lidar sweeps over time the vehicle 100 and mobile objects 205 are moving can be combined to improve of the quality of data about the object 205.

The lidar data can include personally identifiable information (PII), i.e., PII can be obtained from the lidar data. For the purposes of this disclosure, personally identifiable information is defined as a representation of information that permits the identity of an individual to whom the information applies to be reasonably inferred. For example, the objects 205 can include PII, i.e., PII can be obtained or determined from respective objects 205. As one example, an object 205 can include a face of a person, e.g., of a pedestrian in the vicinity of the vehicle 100. As another example, an object 205 can include text, e.g., on a license plate of another vehicle 100. The PII can be extracted, e.g., if the density of the point cloud 200 is sufficiently high in the region 210 encompassing the object 205 so that details of a face or embossing of a license plate can be detected. Alternatively, the PII can be extracted by using the additional sensing characteristics, e.g., if a license plate has characters with a different reflectivity than the background, even if the point cloud 200 is not sufficiently dense. As yet another example, the object 205 can include a person that is walking, for which the PII can be the gait of the person. Alternatively, the point cloud 200 over time can depict a vibration, such as from a doppler shift measurement of the lidar pulse, which includes PII. The vibration can be caused by a person's heartbeat, speech by a person, etc.; e.g., after repeated measurements of a given object, the doppler shift may be used to identify PII information emanating as vibrations from that object.

The vehicle computer 105 and/or remote computer 110 can identify the object 205 using conventional object-recognition techniques. For example, the vehicle computer 105 and/or remote computer 110 can use a convolutional neural network programmed to accept point clouds 200 as input and output an identified object 205. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of object 205, and the final output is the type of object 205 with the highest score.

For another example, the vehicle computer 105 and/or remote computer 110 can fuse the lidar data with sensor data from other sensors, e.g., cameras. Sensor fusion is combining data from disparate sources together so that the resulting data has less uncertainty than if the data from each source were used individually, e.g., in creating a unified model of the surrounding environment of the vehicle 100. The sensor fusion can be performed with one or more algorithms, e.g., Kalman filter, central limit theorem, Bayesian networks, Dempster-Shafer, convolutional neural networks, etc. The vehicle computer 105 and/or remote computer 110 can then apply an identification of the object 205 from the sensor data, e.g., generated by applying conventional image-recognition techniques to camera data, to the object 205 in the lidar data.

The vehicle computer 105 and/or remote computer 110 can be programmed to, in response to the identified object 205 being the type of object 205 that can include PII, determine the density of the region 210 encompassing the object 205. The density can be measured as a number of points per unit volume. The vehicle computer 105 and/or remote computer 110 can determine the density of the region 210 by dividing a number of points constituting the object 205 by a volume of the region 210. The region 210 can be, e.g., a three-dimensional polygonal shape generated such that the points constituting the object 205 are inside and the points not constituting the object 205 are outside.

The vehicle computer 105 and/or remote computer 110 can be programmed to determine whether the density of the region 210 exceeds a threshold. The threshold can be chosen based on a density required to identify a person from a point cloud 200, i.e., a density at which the point cloud 200 has sufficient detail to identify the person, based on known algorithms for facial recognition, text recognition, etc. The threshold can be different for different types of object 205, e.g., a first threshold for a face and a second threshold for a license plate. Further, the threshold can be different based on the data attributes of the lidar data, e.g. polarimetric, ambient intensity, reflectivity, etc. that constitute each point and the respective signal-to-noise level of the data attributes at that point. The vehicle computer 105 and/or remote computer 110 can select a threshold based on the type of the object 205 and/or the data attributes.

The vehicle computer 105 and/or remote computer 110 can be programmed to, upon identifying the object 205, delete a portion of the lidar data that is from the region 210 encompassing the object 205. Deleting the portion of the lidar data can include reducing the density of the point cloud 200 in the region 210 and/or removing or blurring the additional sensing characteristics in the region 210, which will each be described in turn. In other words, the portion of the lidar data can be the fraction of the points in the region 210 that are responsible for pushing the density above the threshold, or the portion of the lidar data can be the additional sensing characteristics in the region 210 that are eliminated or changed, as described below.

The vehicle computer 105 and/or remote computer 110 can be programmed to, upon identifying the object 205, reduce the density of the point cloud 200 in the region 210 encompassing the object 205. Reducing the density of the point cloud 200 in the region 210 can be conditional on the density in the region 210 before reduction exceeding the threshold; i.e., the vehicle computer 105 and/or remote computer 110 may only reduce the density in the region 210 when the starting density in the region 210 is above the threshold. The vehicle computer 105 and/or remote computer 110 can reduce the density to a target density that is below the threshold. The target density can be chosen to be below the threshold by a safety margin, e.g., 10%. The vehicle computer 105 and/or remote computer 110 can reduce the density by deleting a subset of the points so that the ending density equals the target density. For example, if the density is 1.2 times the threshold and the target density is 0.9 times the threshold, then the vehicle computer 105 and/or remote computer 110 can delete 25% of the points. The deleted points can be chosen at random from the points in the region 210. The vehicle computer 105 and/or remote computer 110 can be programmed to, while reducing the density of the point cloud 200 in the region 210, retain the density of the point cloud 200 in a second region 215 that lacks personally identifiable information. The second region 215 can be the remainder of the point cloud 200 outside of any regions 210 with identified objects 205 including PII. For example, the second region 215 can include the points surrounding and outside of the region 210 encompassing the object 205.

For another example, the vehicle computer 105 and/or remote computer 110 can delete the portion of the lidar data from the region 210 by moving at least some of the points, thereby deleting the previous locations of those points. For example, the vehicle computer 105 and/or remote computer 110 can geometrically blur the point cloud 200 in the region 210. Any suitable type of geometric blurring can be used, e.g., gaussian smoothing. For another example, the vehicle computer 105 and/or remote computer 110 can apply random noise to the locations of the points of the point cloud 200 in the region 210. The geometric blurring or random noise can be applied to all the points in the region 210 or to a subset of the points in the region 210, e.g., a sufficient number of points so that the remaining points represent no more than the threshold density.

The vehicle computer 105 and/or remote computer 110 can be programmed to, upon identifying the object 205, remove or blur the additional sensing characteristics in the region 210 encompassing the object 205. For example, the vehicle computer 105 and/or remote computer 110 can remove the additional sensing characteristics by deleting the lidar data that encodes the additional sensing characteristics for the region 210. For another example, the vehicle computer 105 and/or remote computer 110 can blur the additional sensing characteristics in the region 210 by applying a conventional blurring algorithm, e.g., Gaussian blurring.

The vehicle computer 105 and/or remote computer 110 can be programmed to detect a vibration in the locations of the points of the point cloud 200 over time. The vibration can be a periodic oscillation of a point around an equilibrium location. The vehicle computer 105 and/or remote computer 110 can detect the vibration by plotting the components of the location (e.g., x, y, and z) as functions of time and observing oscillatory movement. Alternatively or additionally, the vehicle computer 105 and/or remote computer 110 can detect the vibration by observing oscillatory behavior of the Doppler shift of a point over time, i.e., the relative radial velocity of a point alternates between toward and away from the lidar device 115. Detection of the vibration can be limited to vibrations within a range of amplitudes and/or a range of frequencies. The ranges of amplitudes and frequencies can be chosen to indicate that the vibration may include PII, e.g., ranges associated with heartbeats or speech.

The vehicle computer 105 and/or remote computer 110 can be programmed to, upon detecting the vibration (e.g., detecting the vibration within the range of amplitudes and/or the range of frequencies), obscure the vibration. For example, the vehicle computer 105 and/or remote computer 110 can obscure the vibration by adding noise to the vibration. For the purposes of this disclosure, "noise" is defined as irregular fluctuations. The vehicle computer 105 and/or remote computer 110 can move the locations of the vibrating points by irregular fluctuations over time. Alternatively or additionally, for vibrations detected as Doppler shifts, the vehicle computer 105 and/or remote computer 110 can obscure the vibration by removing the Doppler shift of the points. The vehicle computer 105 and/or remote computer 110 can set the relative radial velocities of the points to zero or to values dictated by the motion of the vehicle 100 and not by the vibration of the points.

The vehicle computer 105 can be programmed to transmit the lidar data from the vehicle 100 to the remote computer 110. The vehicle computer 105 can instruct the transceiver 125 to transmit the lidar data to the remote computer 110. The vehicle computer 105 can transmit the lidar data before generating the point cloud 200, and the remaining steps can be performed by the remote computer 110. Alternatively, the vehicle computer 105 can transmit the lidar data after reducing the density of the point cloud 200 in the region 210 and obscuring the vibration, such that the vehicle computer 105 performs all the steps. Further alternatively, the vehicle computer 105 can transmit the lidar data to the remote computer 110 at any intermediate stage, with the vehicle computer 105 performing the steps before the transmission and the remote computer 110 performing the steps after the transmission.

Figure 3:
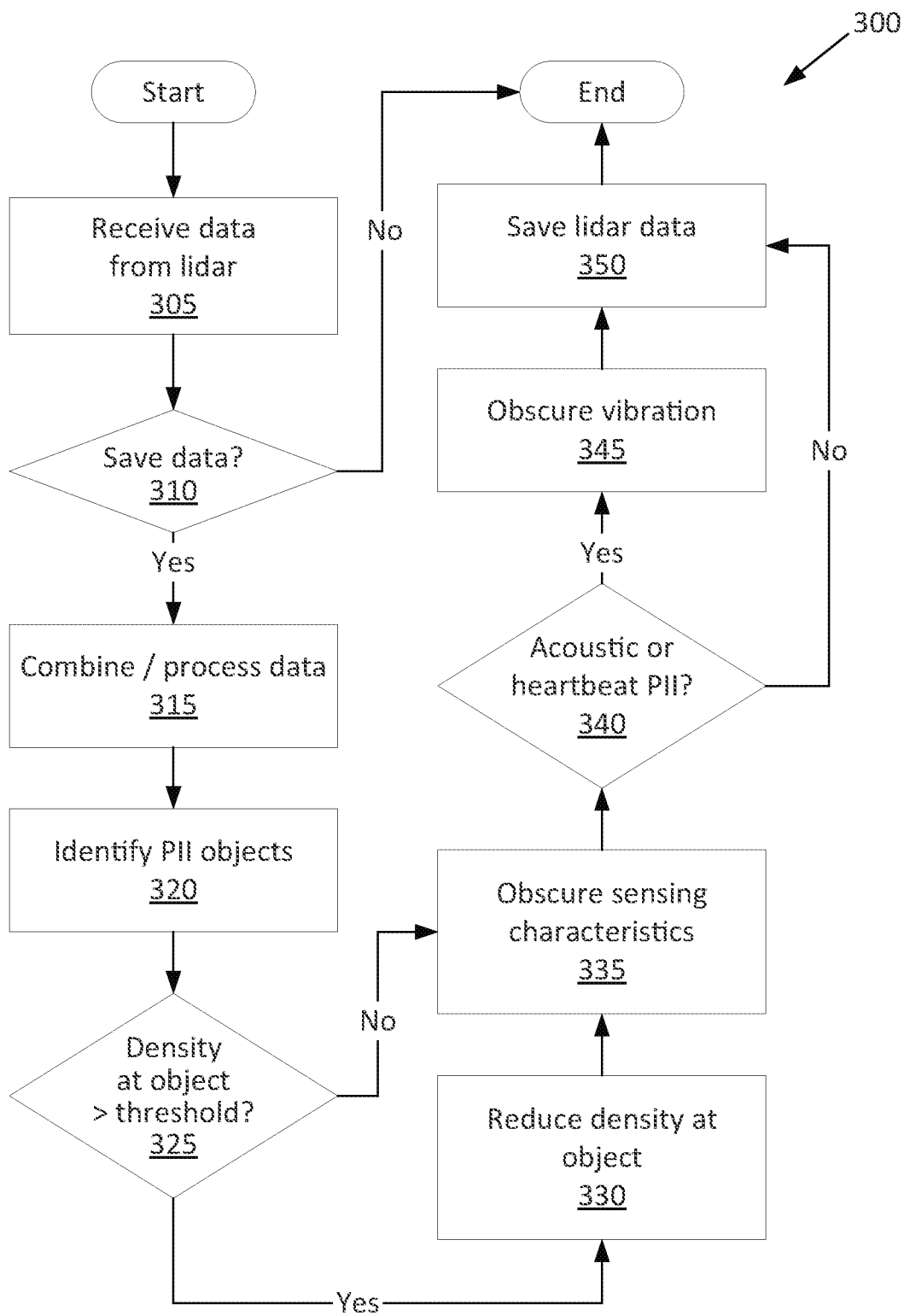
FIG. 3 is a process flow diagram of an example process for removing personally identifiable information from the point cloud.

FIG. 3 is a process flow diagram illustrating an exemplary process 300 for removing personally identifiable information from the lidar data. The memory of the computer stores executable instructions for performing the steps of the process 300 and/or programming can be implemented in structures such as mentioned above. As a general overview of the process 300, the vehicle computer 105 and/or remote computer 110 can receive the lidar data. If the vehicle computer 105 and/or remote computer 110 has received a determination to save the lidar data, the vehicle computer 105 and/or remote computer 110 generates the point cloud 200 and identifies objects 205 including PII. If any of the densities of the regions 210 encompassing the objects 205 are above the threshold, the vehicle computer 105 and/or remote computer 110 reduces the densities of those regions 210. The vehicle computer 105 and/or remote computer 110 obscures the additional sensing characteristics. If the vehicle computer 105 and/or remote computer 110 detects a vibration, the vehicle computer 105 and/or remote computer 110 obscures the vibration. Finally, the vehicle computer 105 and/or remote computer 110 saves the modified lidar data.

The process 300 begins in a block 305, in which the vehicle computer 105 and/or remote computer 110 receives the lidar data from the lidar device 115, as described above. The vehicle computer 105 and/or remote computer 110 may also receive the motion data of the vehicle 100.

Next, in a decision block 310, the vehicle computer 105 and/or remote computer 110 determines whether the vehicle computer 105 and/or remote computer 110 received a determination to save the lidar data. The determination can be an input by an operator or an automatic determination that some criteria is satisfied. The criteria can be chosen, e.g., to indicate that the lidar data relate to something of interest for further analysis, e.g., performance of an ADAS feature of the vehicle 100, a particular object 205 in the lidar data, etc. Upon receiving the determination to save the lidar data, the process 300 proceeds to a block 315. Otherwise, the process 300 ends. Therefore, identifying the object 205 in the point cloud 200, reducing the density of the point cloud 200 in the region 210, and obscuring the additional sensing characteristics can be conditional on receiving the determination to save the lidar data.

In the block 315, the vehicle computer 105 and/or remote computer 110 generates the point cloud 200 from the lidar data, as described above.

Next, in a block 320, the vehicle computer 105 and/or remote computer 110 identifies any objects 205 including PII in the point cloud 200, as described above.

Next, in a decision block 325, the vehicle computer 105 and/or remote computer 110 determines whether the density of the point cloud 200 in any of the regions 210 encompassing the identified objects 205 exceed the threshold, as described above. In response to at least one of the densities of the regions 210 exceeding the threshold, the process 300 proceeds to a block 330. If none of the densities of the regions 210 exceed the threshold, the process 300 proceeds to a block 335.

In the block 330, the vehicle computer 105 and/or remote computer 110 reduces the density of the point cloud 200 in the regions 210 for which the densities exceeded the threshold in the decision block 325, as described above. After the block 330, the process 300 proceeds to the block 335.

In the block 335, the vehicle computer 105 and/or remote computer 110 removes or blurs the additional sensing characteristics in the regions 210 encompassing the identified objects 205, as described above.

Next, in a decision block 340, the vehicle computer 105 and/or remote computer 110 determines whether a vibration has been detected in the lidar data, e.g., a vibration falling within a range of amplitudes and/or a range of frequencies, as described above. Upon detecting such a vibration, the process 300 proceeds to a block 345. Otherwise, the process 300 proceeds to a block 350.

In the block 345, the vehicle computer 105 and/or remote computer 110 obscures the vibration, as described above. After the block 345, the process 300 proceeds to the block 350.

In the block 350, the vehicle computer 105 and/or remote computer 110 saves the lidar data to memory. If the prior blocks were performed by the vehicle computer 105, the vehicle computer 105 transmits the lidar data from the vehicle 100 to the remote computer 110, as described above, and the remote computer 110 saves the lidar data to memory. After the block 350, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
   receive lidar data from a lidar device;
   generate a point cloud from the lidar data;
   identify an object in the point cloud, the object including personally identifiable information; and
   upon identifying the object, delete a portion of the lidar data that is from a region encompassing the object.

2. The computer of claim 1, wherein deleting the portion of the lidar data that is from the region includes reducing a density of the point cloud in the region.

3. The computer of claim 2, wherein reducing the density of the point cloud in the region is conditional on the density in the region before reduction exceeding a threshold.

4. The computer of claim 1, wherein the lidar data includes locations of points and additional sensing characteristics, and deleting the portion of the lidar data that is from the region includes removing or blurring the additional sensing characteristics in the region.

5. The computer of claim 4, wherein the additional sensing characteristics include active illumination reflectance.

6. The computer of claim 4, wherein the additional sensing characteristics include polarization data.

7. The computer of claim 4, wherein the additional sensing characteristics include relative radial velocity.

8. The computer of claim 4, wherein the additional sensing characteristics include ambient illumination.

9. The computer of claim 1, wherein the object includes text.

10. The computer of claim 1, wherein the object includes a face of a person.

11. The computer of claim 1, wherein the object includes a person that is walking.

12. The computer of claim 1, wherein the instructions further include instructions to:
   detect a vibration in locations of points of the point cloud over time, the vibration including personally identifiable information; and
   upon detecting the vibration, obscure the vibration.

13. The computer of claim 12, wherein obscuring the vibration includes removing doppler shift of the points.

14. The computer of claim 12, wherein obscuring the vibration includes adding noise to the vibration.

15. The computer of claim 12, wherein the instructions further include instructions to:
   receive motion data of a vehicle including the lidar device; and
   before detecting the vibration, adjust the point cloud based on the motion data.

16. The computer of claim 1, wherein identifying the object in the point cloud and deleting the portion of the lidar data from the region are conditional on receiving a determination to save the lidar data.

17. The computer of claim 1, wherein the point cloud is a combined point cloud, the lidar data includes a plurality of individual point clouds from respective sweeps by the lidar device, and the combined point cloud is generated by combining the plurality of individual point clouds.

18. The computer of claim 1, wherein the lidar data is collected over a time range.

19. The computer of claim 1, wherein the instructions further include instructions to transmit the lidar data from a vehicle including the lidar device to a remote computer that is remote from the vehicle.

20. A method comprising:
   receiving lidar data from a lidar device;
   generating a point cloud from the lidar data;
   identifying an object in the point cloud, the object including personally identifiable information; and
   upon identifying the object, deleting a portion of the lidar data that is from a region encompassing the object.

* * * * *